US006254349B1

(12) United States Patent
Haugen et al.

(10) Patent No.: US 6,254,349 B1
(45) Date of Patent: Jul. 3, 2001

(54) DEVICE AND METHOD FOR DETACHABLY CONNECTING AN IMPELLER TO A PINION SHAFT IN A HIGH SPEED FLUID COMPRESSOR

(75) Inventors: Ronald L. Haugen, Mayfield; R. Kevin Klope, West Paducah; James R. Pierce, Mayfield, all of KY (US)

(73) Assignee: Ingersoll-Rand Company, Woodcliff Lake, NJ (US)

(*) Notice: Subject to any disclaimer, the term of this patent is extended or adjusted under 35 U.S.C. 154(b) by 0 days.

(21) Appl. No.: 09/413,698

(22) Filed: Oct. 6, 1999

Related U.S. Application Data

(60) Provisional application No. 60/142,256, filed on Jul. 2, 1999.

(51) Int. Cl.[7] ..................................................... F04D 29/34
(52) U.S. Cl. ............................ 416/204 A; 415/216.1; 416/244 A
(58) Field of Search ....................... 415/216.1; 416/204 R, 416/204 A, 244 R, 244 A; 403/354, 360

(56) References Cited

U.S. PATENT DOCUMENTS

| | | |
|---|---|---|
| 1,873,956 | 8/1932 | Dahlstrand . |
| 1,912,408 | 6/1933 | Schelhammer . |
| 2,179,556 | 11/1939 | Lysholm . |
| 2,438,867 | 3/1948 | Rockwell et al. . |
| 2,441,467 | 5/1948 | Browning . |
| 2,577,134 | 12/1951 | Land . |
| 2,799,445 | 7/1957 | Hull . |
| 2,892,646 | 6/1959 | Doble . |
| 2,923,563 | 2/1960 | Doble . |
| 2,946,610 | 7/1960 | Jenness . |
| 2,960,939 | 11/1960 | Buschhorn et al. . |
| 3,019,039 | 1/1962 | Clavell . |
| 3,104,459 | 9/1963 | Wendt . |
| 3,131,956 | 5/1964 | Bailey . |
| 3,359,912 | 12/1967 | Gates . |
| 3,447,392 | 6/1969 | Kawchitch . |
| 3,534,640 | 10/1970 | Macy . |
| 3,597,105 | 8/1971 | Sadler et al. . |
| 3,604,819 | 9/1971 | Krahe et al. . |
| 3,666,302 | 5/1972 | Kellett . |
| 3,771,927 | 11/1973 | Schiller . |
| 3,884,595 | 5/1975 | Herrick . |
| 3,889,352 | 6/1975 | Bosse . |
| 3,936,926 | 2/1976 | Hornschuch . |
| 4,065,219 | 12/1977 | Levine . |
| 4,074,946 | 2/1978 | Swearingen . |
| 4,130,374 | 12/1978 | Bingler . |

(List continued on next page.)

FOREIGN PATENT DOCUMENTS

| | | |
|---|---|---|
| 604 730 | 7/1948 | (GB) . |
| 770 004 | 3/1957 | (GB) . |
| 62017413 | * 1/1987 | (JP) . |
| 08-200384 | 8/1996 | (JP) . |

*Primary Examiner*—Edward K. Look
*Assistant Examiner*—Ninh Nguyen
(74) *Attorney, Agent, or Firm*—Michael Best & Friedrich LLP

(57) ABSTRACT

A compressor rotor assembly including an impeller including an impeller stem, the stem including a first coupling end having a first face and at least one arcuate coupling tab along the first face; the impeller stem further comprising a bore that extends inwardly from the first face, the bore having an interior wall that is tapered. The rotor assembly further comprising a pinion shaft having a second coupling end with a second face and at least one arcuate coupling slot along the second face; and a hub extending outwardly from the second face, the hub including a tapered outer wall; the first and second coupling means and the hub and bore are adapted to be mated when the impeller and pinion shaft are assembled to prevent relative displacement of the stem and shaft.

18 Claims, 3 Drawing Sheets

U.S. PATENT DOCUMENTS

| | | |
|---|---|---|
| 4,257,744 | 3/1981 | Watson . |
| 4,294,562 | 10/1981 | Mullenberg . |
| 4,349,291 * | 9/1982 | Geary, Jr. ............................... 403/15 |
| 4,400,136 | 8/1983 | Seyffert . |
| 4,411,551 | 10/1983 | Adelbratt . |
| 4,417,855 | 11/1983 | Jepsen . |
| 4,491,421 | 1/1985 | Koehl et al. . |
| 4,519,747 * | 5/1985 | Yamazaki et al. ............... 416/244 A |
| 4,578,852 | 4/1986 | Sauerwein et al. . |
| 4,587,715 | 5/1986 | Hallerback . |
| 4,606,103 | 8/1986 | Koehl et al. . |
| 4,628,574 | 12/1986 | Lerman . |
| 4,643,648 | 2/1987 | Huller . |
| 4,688,989 | 8/1987 | Kondo et al. . |
| 4,719,074 | 1/1988 | Tsuno et al. . |
| 4,722,630 * | 2/1988 | Fang ........................................ 403/30 |
| 4,749,334 * | 6/1988 | Byrne ............................... 416/241 B |
| 4,826,347 | 5/1989 | Baril et al. . |
| 4,832,573 | 5/1989 | Dorski . |
| 4,841,622 | 6/1989 | Murano et al. . |
| 4,890,982 | 1/1990 | Riback . |
| 5,088,887 | 2/1992 | Bosen et al. . |
| 5,116,202 | 5/1992 | Lin . |
| 5,210,945 | 5/1993 | Suzuki . |
| 5,365,661 | 11/1994 | Mizuno et al. . |
| 5,407,296 | 4/1995 | Brown . |
| 5,482,437 | 1/1996 | Houston et al. . |
| 5,779,449 | 7/1998 | Klein . |
| 5,855,065 | 1/1999 | Cheung . |

\* cited by examiner

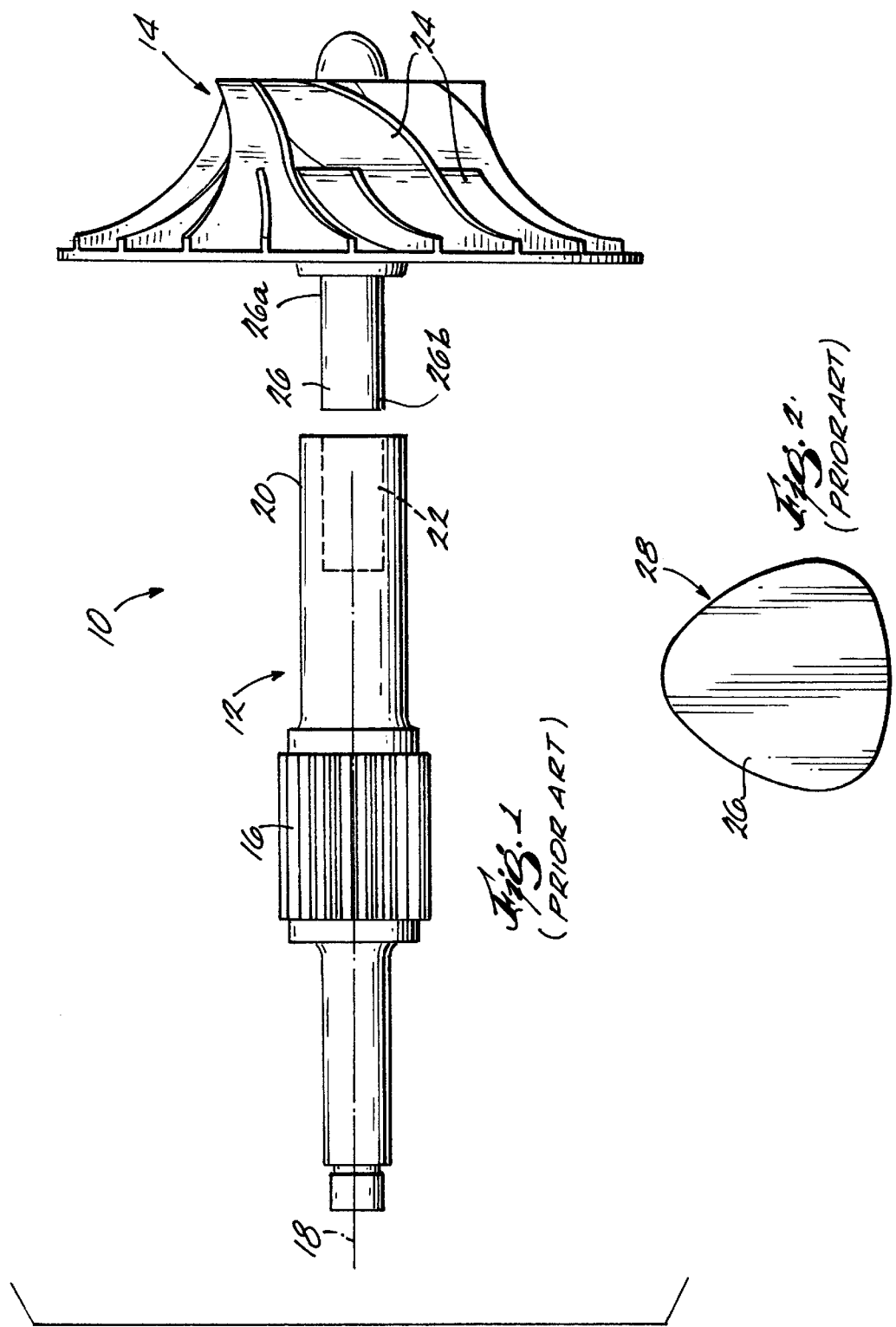

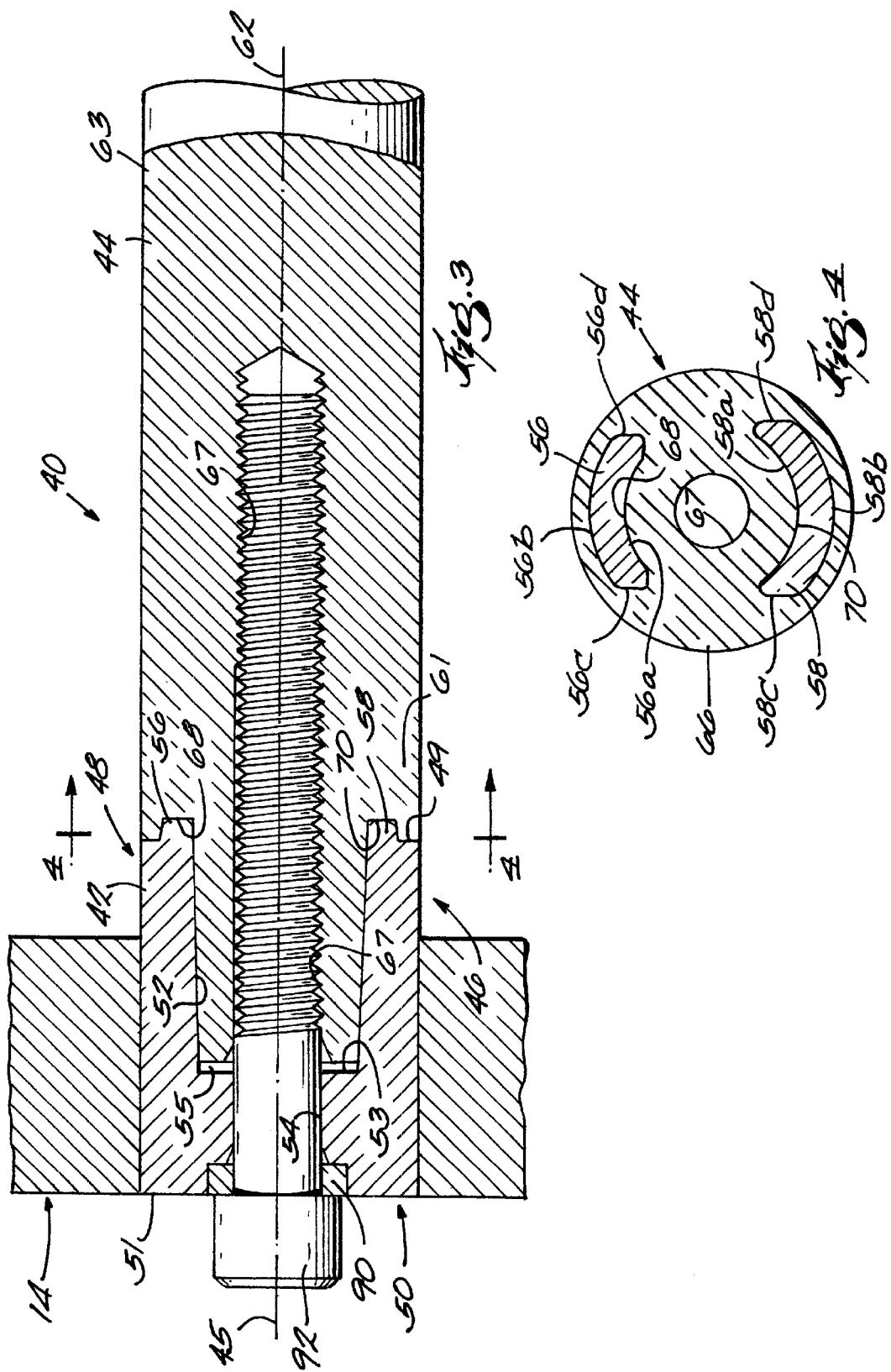

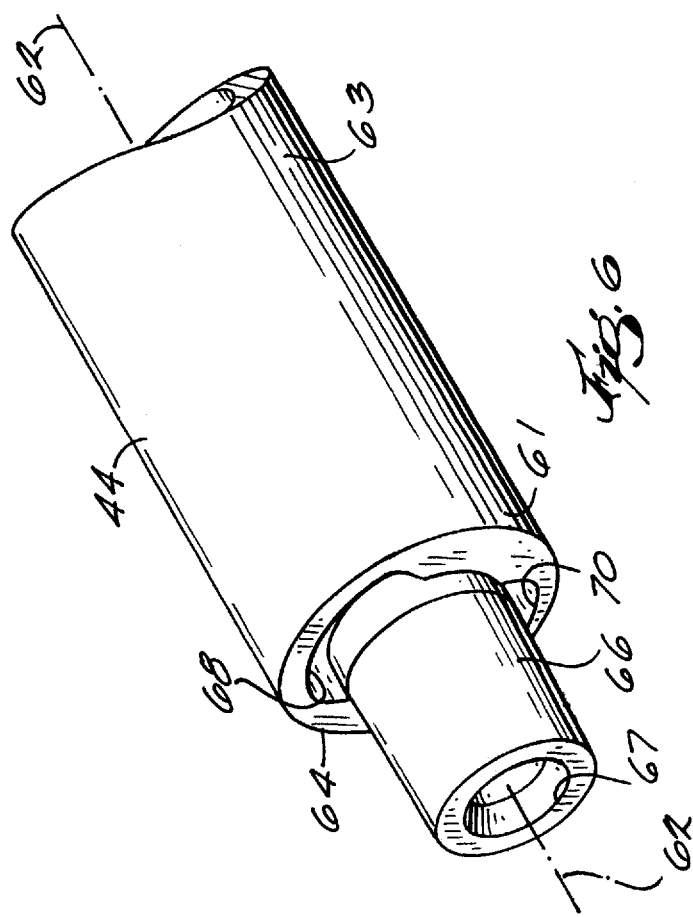
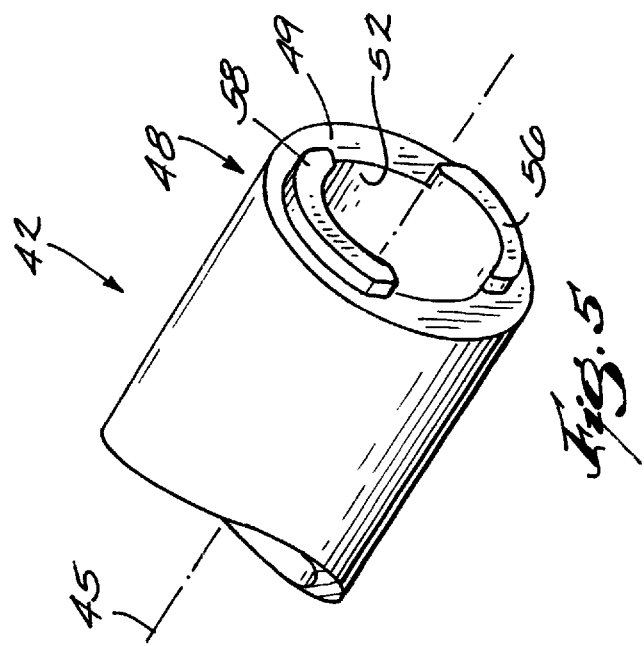

DEVICE AND METHOD FOR DETACHABLY CONNECTING AN IMPELLER TO A PINION SHAFT IN A HIGH SPEED FLUID COMPRESSOR

BACKGROUND OF THE INVENTION

This application claims the benefit of U.S. Provisional Application No. 60/142,256 filed Jul. 2, 1999.

The present invention relates to a device and method for detachably connecting an impeller member to a pinion shaft member in a high speed fluid compressor, and more particularly the invention relates to a connection device and method where one of the members includes at least one tab that is inserted into a corresponding at least one slot provided on the other member.

A high speed fluid compressor such as a centrifugal compressor includes a rotor assembly that is comprised of an impeller that is coupled to a pinion shaft which includes a pinion gear that meshes with a drive gear to drive the impeller at high rotational velocities of up to 76,000 rpm, for example. The suitable attachment between the impeller and pinion must be able transmit torque from the pinion gear to the impeller, maintain zero relative motion of the impeller relative to the pinion, permit easy assembly and disassembly of the rotor assembly, and consistently relocate the pinion and impeller at their original relative positions when the components are reassembled. Accurate maintenance of the relative positions of the impeller and rotor is critical to ensure that the rotor assembly retains its dynamic balance.

The impeller and pinion shaft are conventionally coupled by a polygon attachment method. The principal advantages of the polygon attachment method are its ease of assembly/disassembly and self centering characteristic. The polygon must consistently lock up the impeller and pinion shaft at the same position to maintain the needed level of rotor balance. Any relative movement between the pinion shaft and impeller leads to unacceptable levels of vibration during compressor operation. To ensure the requisite consistency is obtained, the mating parts must be machined to very exacting tolerances.

FIG. 1 illustrates a prior art rotor assembly generally comprised of pinion shaft 12 coupled to an impeller 14 by a polygon attachment method. The pinion shaft 12 includes pinion gear 16 which is engageable with a power transmission assembly (not shown) which drives the pinion about a pinion axis 18 at a predetermined rotational velocity during operation of the centrifugal compressor. The pinion shaft 12 includes a drive end 20 which has formed therein a polygonally dimensioned bore 22. The polygonally dimensioned bore 22 has an interior bore surface which defines a generally triangular cross section composed of circular arcs.

The impeller 14 incorporates a backward-leaning type blade geometry 24, and the impeller includes a polygonally dimensioned stem portion 26 which is defined by an exterior stem surface 28. The stem portion 26 includes a first end 26a and a second end 26b. The polygonally dimensioned stem portion 26 is suitably matingly dimensioned to be received by the polygonally dimensioned bore 22. The stem portion 26 is typically dimensioned to have a cross section which deviates from a circular pattern and which has a shape that is convex on all sides and essentially elliptical, triangular or quadratic as illustrated in FIG. 2. After coupling the pinion shaft and impeller, the pinion shaft is rotated and the lobes along the stem 26 are locked against adjacent portions of bore 22.

The polygon attachment method has a number of shortcomings. The polygon attachment method is useful because it is repeatable and maintains permanent location by its shape. However, if the mating parts are not parallel and the shapes of the lobes are not accurately calculated and precisely machined, as the rotor assembly comes up to speed stresses in the components may alter the shapes of the lobes and as a result loosen the connection between the pinion shaft and impeller. Also, the compressor could experience surge or vibration that occurs during operation and as a result the surge or vibration could displace the impeller to a new location and out of balance. The polygon is expensive and difficult to manufacture. The mating polygon surfaces are difficult to measure for quality and precision. The continuous rubbing and surface contact on highly stressed polygonally shaped parts causes galling and fretting of the parts and the galling and fretting could cause the impeller and pinion shaft to be fused together.

The foregoing illustrates limitations known to exist in present devices and methods for assembling impellers and pinion shafts. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a rotor assembly that includes an impeller including an impeller stem, the stem including a first coupling end having a first face and first coupling means along the first face; and a pinion shaft having a second coupling end with a second face and second coupling means along the second face, the first and second coupling means adapted to be mated when the impeller and pinion shaft are assembled to prevent relative displacement of the impeller and pinion shaft.

The first coupling means is comprised of at least one arcuate tab, and the second coupling means is comprised of at least one arcuate slot adapted to receive the at least one arcuate tab when the impeller stem and pinion shaft are mated. Each tab includes an inner arcuate surface, and substantially planar terminating surfaces joining the inner and outer arcuate surfaces; the arcuate tabs having different arclengths and widths. If one tab is included, the tab is simply inserted into the mating slot, and if more than one tab is provided, the tabs are different with different arclengths so that they can only be inserted into their mating slot and in this way the required relative orientation between the stem and pinion shaft is maintained.

In addition to the tab/slot coupling structure the pinion shaft includes a hub that extends outwardly from the second face and is adapted to be mated with a bore formed in the impeller stem. The wall of the bore and hub are tapered so that an interference fit is created when the hub is inserted in the bore.

In summary, the present invention is comprised of an attachment device and method comprised of a set of tabs/slots and tapered cylindrical hub. The tab/slot feature is used to transmit power between the mated parts and the tab/slot feature limits assembly of the component parts to a single orientation ensuring that the pinion shaft and impeller will be assembled at the same relative position when the parts are disconnected and then reassembled. The tapered cylindrical hub achieves an interference fit between the mating parts, and thus ensures that the two mating parts do not move relatively in the radial dimension. This ensures retention of dynamic balance of the assembly. Also, the interference fit that is achieved, provides additional power transmission capability. This design provides means to achieve the needed joint stiffness, balance retention, and power transmission capabilities while it can more easily be manufactured than the conventional polygon and other attachment methods.

The foregoing and other aspects will become apparent from the following detailed description of the invention when considered in conjunction with the accompanying drawing figures.

DESCRIPTION OF THE DRAWING FIGURES

FIG. 1 is an exploded, side elevational view of an impeller and a pinion shaft of a prior art rotor assembly for a centrifugal compressor;

FIG. 2 is an end view of a polygonally dimensioned stem portion of the prior art impeller illustrated in FIG. 1;

FIG. 3 is a longitudinal sectional view of the impeller and pinion shaft of the rotor assembly of our present invention;

FIG. 4 is a lateral sectional view taken along line 4—4 of FIG. 3;

FIG. 5 is a perspective view of the coupling end of the impeller shaft of FIG. 3; and FIG. 6 is a perspective view of the coupling end of the pinion shaft of FIG. 3.

DESCRIPTION OF THE PREFERRED EMBODIMENT

Turning now to the drawings wherein like parts are referred to by the same number throughout the several views, FIGS. 3–6 illustrate the rotor assembly coupling of the present invention. Specifically, FIG. 3 shows the rotor assembly 40 that includes impeller 14 that is made integral with impeller stem 42, and pinion shaft 44 that includes pinion (not shown) like pinion 16. The pinion shaft and impeller shaft are detachably joined by assembly coupling 46.

As will be described hereinbelow, the assembly coupling of the present invention ensures that the mating impeller stem and pinion shaft do not move relatively in the radial dimension during compressor operation. The assembly coupling 46 provides means to achieve the needed joint stiffness, balance retention, and power transmission capabilities and it can more easily be manufactured than the conventional polygon and other attachment methods.

Turning to FIGS. 4 and 6, the unitary pinion shaft 44 includes a coupling end 61, a free end 63, and axis 62. The coupling end includes a lateral face 64. A coupling hub 66 extends axially away from face 64 and has a tapered exterior surface that tapers inwardly as the hub extends away from the pinion shaft lateral face 64. A threaded bore 67 adapted to receive a bolt or another conventional fastener extends along axis 62 through the hub 66 and a portion of the pinion shaft 44. Opposed arcuate slots 68 and 70 are provided in lateral face 64. Each slot includes inner and outer arcuate surfaces that are joined by substantially planar terminating surfaces. However, the arcuate slots are not the same and slot 70 has a greater arclength and width than slot 68. As shown in FIGS. 4 and 6, the slots are separated by approximately 180 degrees.

Turning now to FIGS. 4 and 5, the unitary impeller stem portion 42 includes a coupling end 48, free end 50, and longitudinal axis 45. The coupling end 48 terminates in lateral face 49 and free end 50 terminates in lateral face 51. A substantially cylindrical bore 52 extends inwardly from coupling end face 49 to position within the stem, and the bore 52 includes a wall that is tapered inwardly as it extends inwardly away from the lateral face 49. See FIG. 4. The bore terminates at lateral end face 53, and the end face and inwardly tapered side wall define a cavity 55. A countersunk bore 54 extends between bore 52 and lateral face 51.

First and second tabs 56 and 58 are provided along lateral face 51. The tabs are used to accurately and consistently relatively orient and locate the coupled impeller stem and pinion shaft. The tabs extend outwardly from lateral face 49 and are substantially perpendicular to the face and are offset by about 180 degrees. Each tab is substantially arcuate with inner and outer arcuate surfaces joined by substantially planar terminating surfaces. As shown in FIG. 4, first tab 56 includes inner and outer arcuate surfaces 56a and 56b respectively which are joined by terminating surfaces 56c and 56d, and second tab 58 includes inner and outer arcuate surfaces 58a and 58b respectively which are joined by terminating end surfaces 58c and 58d. As shown in FIG. 4, the tabs are not the same and have different arc lengths and widths. Tab 58 is adapted to be fitted into slot 70 and tab 56 is adapted to be fitted into slot 68. In this way, when the rotor assembly is disassembled, it can be assembled so that the impeller and pinion shaft are coupled in the same relative position before they were disassembled.

Although two slots and tabs are illustrated and described, it should be understood that any suitable number of mating slots and tabs may be used to obtain and maintain the desired relative positioning and orientation between the pinion shaft and impeller stem. Although in the description the tabs are provided on the stem lateral face 49, and the slots are provided on the pinion shaft lateral face 64, it should also be understood that the tabs could be provided on the pinion shaft face 64 and the slots could be provided on lateral coupling face 49.

Assembly and disassembly of the rotor assembly 40 will now be described. When it is necessary to assemble rotor assembly 40, axes 45 and 62 are aligned and hub 66 is slid into bore 52. The hub and bore are dimensioned so that as the hub is inserted into the bore an clamping load is produced as a result of the interference fit between the tapered bore and hub surfaces. It has been determined by the coinventors that the resultant clamping load is sufficient to prevent relative movement of the impeller and pinion shaft.

As the hub is slid into the bore, tabs 70 and 68 are aligned with their respective slots 58 and 56, so that the tabs are located in the respective slots when the hub is located in the bore 52. The tabs ensure the desired relative location of the stem and pinion shaft after the completion of maintenance. After seating an o-ring seal 90 in the large diameter portion of countersunk bore 54, bolt 92 is passed through bore 54 and bore 67 and is tightened until the ends of the tabs are in contact with the back of the slots. See FIG. 3.

When it is necessary to service the rotor assembly, the bolt 92 is removed and the impeller is displaced axially from its location along the pinion shaft.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A compressor rotor assembly comprising:
   a) an impeller including an impeller stem, the stem including a first coupling end having a first face and first coupling means along the first face, the first coupling means including at least one arcuate tab; and b) a pinion shaft having a second coupling end with a second face coupling means along the second face the second coupling means including at least one arcuate slot, the at least one arcuate tab end and at least one arcuate slot being adapted to be mated when the impeller and pinion shaft are assembled to prevent relative displacement of the impeller and pinion shaft.

2. The compressor rotor assembly as claimed in claim 1 wherein the first coupling means is comprised of two arcuate tabs.

3. The compressor rotor assembly as claimed in claim 2 wherein each arcuate tab includes an outer arcuate surface, an inner arcuate surface, and substantially planar terminating surfaces joining the inner and outer arcuate surfaces; the arcuate slots having different arclengths and widths.

4. The compressor rotor assembly as claimed in claim 1 wherein the second coupling means is comprised of two arcuate slots.

5. The compressor rotor assembly as claimed in claim 4 wherein each arcuate slot is defined by an outer arcuate surface, an inner arcuate surface, and substantially planar terminating surfaces joining the inner and outer arcuate surfaces; the arcuate slots having different arclengths and widths.

6. The compressor rotor assembly as claimed in claim 1 the compressor rotor assembly further comprising a hub extending outwardly from the second face; and the impeller stem including a bore extending inwardly from the first face, the bore adapted to receive the hub when the impeller and pinion shaft are assembled.

7. The compressor rotor assembly as claimed in claim 6 wherein the hub includes a tapered outer surface and the bore includes a tapered inner wall.

8. The compressor rotor assembly as claimed in claim 1 wherein the first coupling means is comprised of a tapered bore.

9. The compressor rotor assembly as claimed in claim 1 wherein the second coupling means is comprised of a tapered hub.

10. A high speed compressor that includes a rotor assembly, the rotor assembly comprising:
   a) an impeller including an impeller stem, the stem including a first coupling end having a first face and first coupling means along the first face; the impeller stem further comprising a bore that extends inwardly from the first face, the bore having an interior wall that is tapered; and
   b) a pinion shaft having a second coupling end with a second face and second coupling means along the second face, and a hub extending outwardly from the second face the hub including a tapered outer wall; the first and second coupling means and the hub and bore are adapted to be mated when the impeller and pinion shaft are assembled to prevent relative displacement of the impeller stem and pinion shaft.

11. The compressor rotor assembly as claimed in claim 10 wherein the first coupling means is comprised of at least one tab.

12. The compressor rotor assembly as claimed in claim 11 wherein the first coupling means is comprised of two arcuate tabs.

13. The compressor rotor assembly as claimed in claim 12 wherein each arcuate tab includes an outer arcuate surface, an inner arcuate surface, and substantially planar terminating surfaces joining the inner and outer arcuate surfaces; the arcuate tabs having different arclengths and widths.

14. The compressor rotor assembly as claimed in 10 wherein the second coupling means is comprised of at least one slot.

15. The compressor rotor assembly as claimed in claim 14 wherein the second coupling means is comprised of two arcuate slots.

16. The compressor rotor assembly as claimed in claim 15 wherein each arcuate slot is defined by an outer arcuate surface, an inner arcuate surface, and substantially planar terminating surfaces joining the inner and outer arcuate surfaces; the arcuate slots having different arclengths and widths.

17. The compressor rotor assembly as claimed in claim 10 wherein the first coupling means is comprised of at least one tab, and the second coupling means is comprised of at least one slot, each tab being adapted to fit in a single slot to ensure accurate relative positioning of the impeller and pinion shaft.

18. In a fluid compressor comprising a rotor assembly, the rotor assembly comprising; an impeller including an impeller stem, the stem including an axis, a first coupling end having a first face and a plurality of coupling tabs along the first face; the impeller stem further comprising a bore that extends inwardly from the first face, the bore having an interior wall that is tapered; the rotor assembly further comprising a pinion shaft having an axis, a second coupling end with a second face and a plurality of coupling slots along the second face, and a hub extending outwardly from the second face the hub including a tapered outer wall, a method for assemblying the impeller stem and pinion shaft the method comprising the steps of: aligning the axes of the pinion shaft and the stem; inserting each tab into a slot and inserting the hub into the bore.

* * * * *